May 6, 1958 R. M. GUSTAFSON 2,833,209

CONSECUTIVE NUMBER PRINTER

Filed Dec. 30, 1954 2 Sheets-Sheet 1

INVENTOR.
ROBERT M. GUSTAFSON

BY Joe L. Koerber

ATTORNEY

May 6, 1958 R. M. GUSTAFSON 2,833,209

CONSECUTIVE NUMBER PRINTER

Filed Dec. 30, 1954 2 Sheets-Sheet 2

INVENTOR.
ROBERT M. GUSTAFSON

BY Joe L. Koerber
ATTORNEY 2,833,209
Patented May 6, 1958

2,833,209

CONSECUTIVE NUMBER PRINTER

Robert M. Gustafson, Poughkeepsie, N. Y., assignor to International Business Machines Corporation, New York, N. Y., a corporation of New York Application December 30, 1954, Serial No. 478,616
7 Claims. (Cl. 101—79)

This invention relates to a device for automatically printing consecutive numbers as number receiving documents are serially presented at a print station.

It is customary in maintaining stocks of goods to submit orders consisting of a number of different articles. In many record maintenance operations it is the practice to prepare an individual record card, for example, a code perforated card, for each item. To facilitate the checking of an order to determine whether all items have been included, it is helpful to number the individual record cards consecutively so that any gap in the sequence of numbers will indicate clearly that a record card is missing.

In an installation that uses perforated record cards, the numbering operation is facilitated and the opportunity for error is minimized if the consecutive numbering operation is performed automatically as the records pass through the perforating machine during the normal processing.

In accordance with the foregoing method of record maintenance, it is the main object of the present invention to provide means for consecutively numbering record cards as they arrive at a print station.

Another object of the invention is to selectively print consecutive numbers on consecutive cards, or to print each number a predetermined number of times before advancing the printing head to the next consecutive number, or to print the same number on each of the serially presented record cards.

Still another object of the invention is to provide numbering means operatively connected with a record handling machine for numbering records in a predetermined sequence.

Yet another object of this invention is to provide means for disabling the print mechanism when a card is not in the print position at print time.

Another object is to provide means to lock the print device in an operated position for servicing and to provide an interlock to prevent operation while the device is being serviced.

Still another object of the invention is to provide means for inking the print elements after each print operation.

Other objects of the invention will be pointed out in the following description and claims and illustrated in the accompanying drawings, which disclose by way of example, the principle of the invention and the best mode which has been contemplated of applying that principle.

The numbering device described hereinafter is generally designated 1 and is illustrated as adapted to a record perforating machine of the type that is fully disclosed in Patent Number 2,647,581 issued August 4, 1953, to E. W. Gardinor et al. Only so much of that machine as is necessary to the understanding of the present invention is included herein. Reference may be had to the above cited patent, hereinafter referred to as the Gardinor patent, for additional details of the machine.

In the perforating machine disclosed in the Gardinor patent, a plurality of records are placed in a card hopper and means are provided for feeding the cards one at a time from the hopper to a pre-registration position, then to a perforation station through which the cards are advanced in a step-by-step manner and data are perforated therein under control of a manual keyboard or by duplication from a record at a record sensing station. After passing through the perforation station the cards are advanced to the record sensing station while a following card is advanced to the perforation station. A card passes through the sensing station in a step-by-step manner while the following card advances through the perforating station in the manner described. After leaving the sensing station a card is first advanced to the left on a line with the sensing and punching stations and then is moved at right angles to the previous direction of movement to a stacking hopper.

After a card reaches its left most point and before it is moved at right angles to stacking hopper, the numbering device 1 is actuated to print an appropriate number across the leading end of the card. It will be apparent that the number could be printed elsewhere on the card by varying the position of the print mechanism, but but the preferred position in the described machine is across the end of each card.

Figures 1, 3:
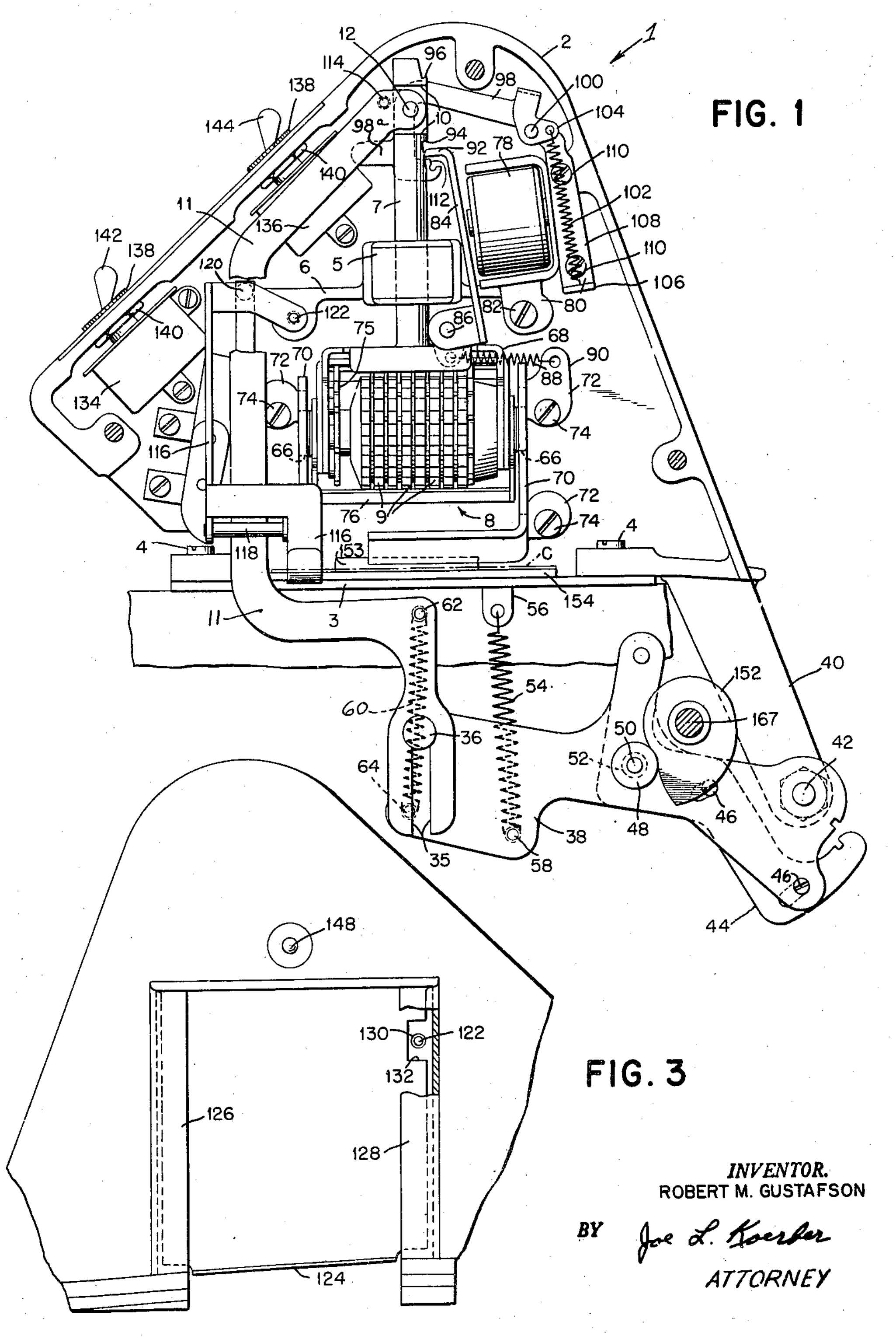
Fig. 1 is a side elevation of the end print unit with the side cover removed.
Fig. 3 is a left side elevation of the print unit cover.
Figures 2, 4, 5:
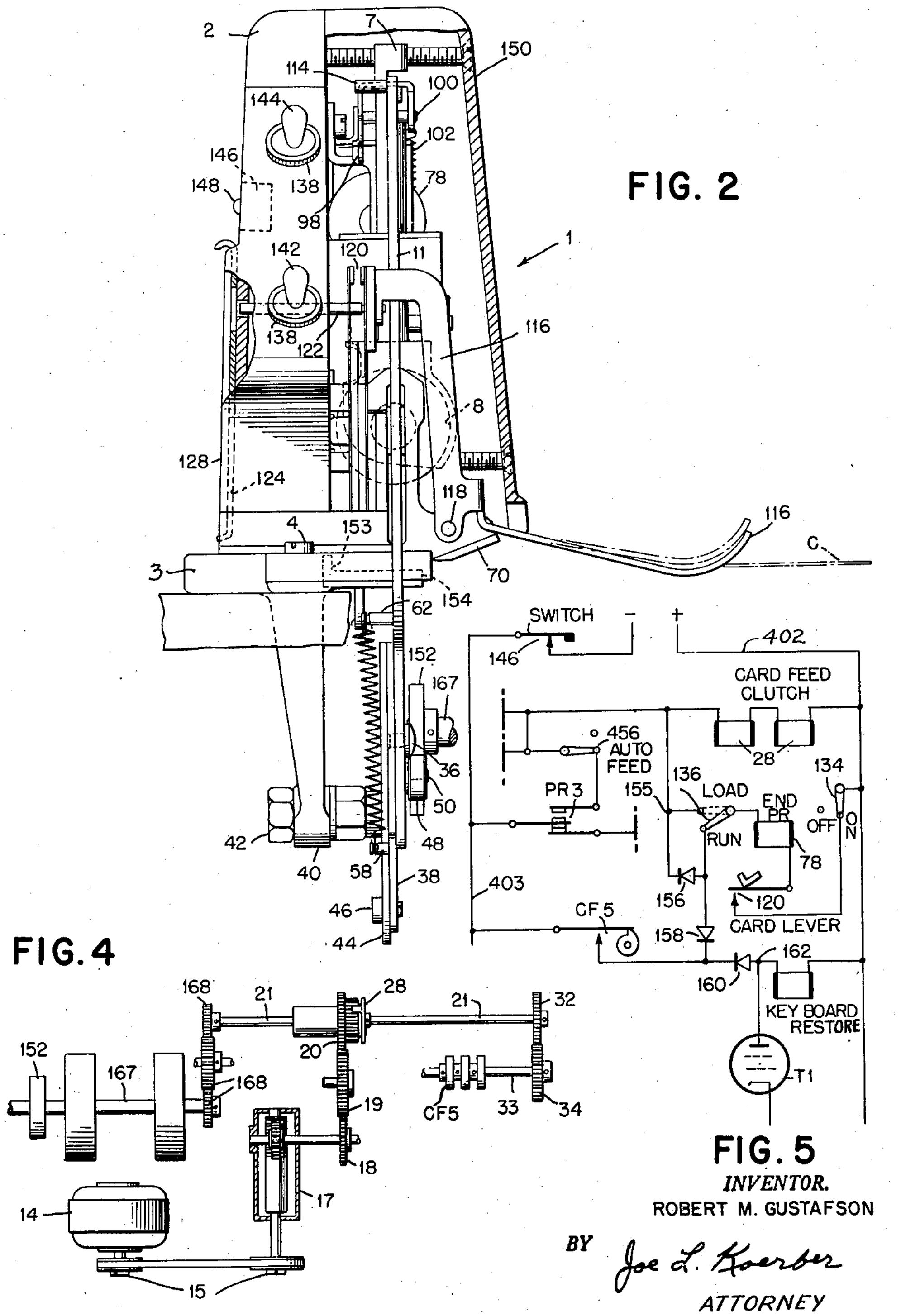
Fig. 2 is a front elevation of the print unit with the right hand cover broken away.
Fig. 4 is a schematic showing of the drive mechanism.
Fig. 5 is a partial wiring diagram showing the electrical control circuits.

As shown in Figs. 1 and 2, a casting 2 is fixed to the left end of a card bed 3 by a pair of screws 4. A self-aligning collar 5, fixed to the casting 3 by means of a bracket 6, guides a shaft 7 that carries a print head 8 comprising a plurality of rotatable character wheels 9. The shaft 7 is recessed at a point 10 where a link 11 is pinned by a stud 12. The link 11 extends downwardly to a point where its bifurcated lower end 35 slidably engages a stud 36 that is carried by an arm 38 that is pivoted on an extended arm 40 of the casting 2 by a bolt 42. A member 44 is adjustably fixed to the arm 38 by means of a pair of screws 46 and carries a rotatable roller 48 on a stud 50 that extends through an opening 52 in the arm 38. The arm 38 is biased upwardly by a spring 54 that is fixed to a lug 56 on the card bed 3 and to a stud 58 on the arm 38. The link 11 and the arm 38 are yieldingly coupled by a spring 60 that is fixed at one end to a stud 62 on the link 11 and at the other end to a stud 64 on the arm 38.

The print head 8 is guided at either side by pin members 66 fixed in a U-shaped frame member 68 that is fixed to the shaft 7. The pins 66 are slidably positioned in slotted guide members 70 that are fixed to the casting 2 by brackets 72 and screws 74.

The print head 8 and the means for automatically advancing one or more character wheels after each print operation to present the next consecutive number are of the type shown and described in the Patent No. 1,091,-279, issued March 24, 1914 to T. H. Boss. The print device includes selectively adjustable means 75 for causing the character wheels to advance after each print operation, or to advance after two print operations, or to remain fixed so that the same number is printed repeatedly. The print unit also includes means for swinging an ink pad 76 into contact with the print elements that are to be used in the next print operation. When the print head returns upwardly after printing, the character wheels 9 are automatically advanced and are thereafter inked. When the print head moves downwardly for a print operation, the ink pad 76 swings away from the print elements. The print head, the advancing means and the inking means do not comprise invention per se and operate in the manner described in the Patent 1,091,279, to which reference may be had for additional details.

An electromagnet 78 is mounted on the casting 2 by a bracket 80 and a screw 82. An armature 84 is pivoted on the casting by a stud 86 and is biased in a counterclockwise direction by a spring 88 the other end of which is fixed to an ear 90 that forms a part of the right hand bracket 72. The armature 84 has an offset lug 92 that is adapted to contact the shaft 7 when the electromagnet 78 is deenergized. The lug 92 engages a notch 94 or 96 depending on whether the print head 8 and shaft 7 are in actuated (down) position or an unactuated (raised) position.

An arm 98 is pivoted on the casting 2 by a stud 100 and is biased in a clockwise direction by a spring 102 that is fixed to an ear 104 of the arm 98 and to a lug 106 of a bracket 108 that is fixed to the casting 2 by a pair of screws 110. The arm 98 has a stepped end portion 112 that bears upwardly against the armature lug 92 under tension of the spring 102 and, when the armature is actuated by the electromagnet 78, the arm 98 is pivoted in a clockwise direction by the spring 102 and the surface 112 of the arm 98 is interposed between the armature lug 92 and the shaft 7 so that only a momentary actuation of the armature is required and the arm 98 is then effective to hold the armature in the actuated position with the lug 92 clear of the notches 94 and 96 in the shaft. The print head 8 is actuated by being moved downwardly through its connection with the link 11. The print head actuation is described more fully hereinafter. When the print head approaches its lower most point of travel, a stud 114 fixed in the link 11 strikes a lug portion *98a* of the arm 98 and cams the arm 98 in a counterclockwise direction and removes the interposed stepped end 112 of the arm 98 so that the armature 84 is free to return to its unactuated position if the electromagnet 78 is deenergized.

A card lever 116, shown in Figs. 1 and 2, is pivoted on a stud 118 that is fixed to the left hand guide member 70. The lower end of the lever 116 is positioned adjacent the card bed 3 and is rotated slightly in a counterclockwise direction as viewed in Fig. 2, when a record card C moves between the lever and the card bed. The upper end of the card lever 116 actuates a pair of electrical contacts 120 that are mounted on the casting 2. The function of the contacts 120 is described hereinafter in the circuit description. The upper end of the lever 116 also carries a pin 122 that forms a mechanical interlock to prevent the actuation of the contact 120 during servicing of the print unit and prevents actuation of a service door 124 while the machine is in operation. As seen in Figs. 2 and 3, a sliding door 124 is provided in the casting 2 to allow access to the print unit for various servicing purposes. Two channels 126 and 128 are formed on the casting for slidably mounting the door. A hole 130 is bored in the casting 2 to receive the pin 122 and a notch 132 is cut in the door 124 to permit passage of the pin 122 into a portion of the hole 130 that extends into the right hand door retaining channel 128. When the door 124 is raised, the notch 132 and the hole 130 are no longer aligned and the pin 122 is blocked from entering the portion of the hole that is in the channel member 128. When the pin cannot enter the hole, the lever 116 cannot pivot far enough to close the contacts 120. Also, when the pin is in the notch 132, the door 124 cannot be raised.

A pair of toggle switches 134 and 136 are mounted on the casting 2 by threaded members 138 and lock nuts 140. The switches 134 and 136 are operated by levers 142 and 144 respectively. A switch 146 shown in Fig. 2, is mounted on the casting 2 and is operated by a button 148 that is positioned to be actuated when the door 124 is raised. The functions of the switches 134, 136 and 146 are described hereinafter in the circuit description. A right hand cover member 150 encloses the portion of the print unit that extends above the card bed 3.

Referring to Fig. 4, part of the drive connections for the Gardinor machine are shown, including a motor therein designated 14, a belt and pulley drive 15, a worm and gear box 17 and a gear train including gears 18, 19 and 20. The drive also includes a shaft 21 that is connected in driven relation with the gear 20 by an electrically actuated clutch therein designated 28. The shaft 21 carries a gear 32 on one end and a gear 168 on the other end. The gear 32, through a gear 34 drives a card feed shaft 33 that carries a number of card feed contact cams, including a cam CF5, for operating electrical card feed contacts. The gear 168 drives a gear train (also designated 168) for rotating a stacker shaft 167. In accordance with the description in the Gardinor Patent No. 2,647,581, the shaft 21 is rotated during every card feed cycle.

In the Gardinor machine, a program drum therein designated 230 rotates in a step-by-step manner in synchronism with the step-by-step movement of the record cards through the perforation and sensing stations and completes one revolution while a card passes through one of the above stations. Just after a card has left the perforating station and is advancing to the sensing station, a cam surface on the rotating program drum operates pairs of electrical contacts therein designated PR2 and PR3. The contacts PR3 close after perforating of a record is completed and the card has started its advance toward the sensing station, and open as the card arrives at the sensing station.

The operating connections between the Gardinor machine and the herein described numbering device are electrically through the contacts designated CF5 and PR3 in the Gardinor patent, and mechanically through a cam 152 that is mounted on an extension of the shaft 167, as shown in Fig. 4. When a card escapes from the sensing station it is advanced to a card stop member 153 that is fixed to the casting 2. After the card is stopped by the card stop 153 the direction of movement is changed by ninety degrees. When the card arrives at the stop 153, the cam 152 is effective to bear on the roller 48 and to swing the arm 38 sharply in a counterclockwise direction against the tension of the spring 54. The movement of the arm 38 is transmitted, through the spring 60 to the link 11. As the link 11 is moved downwardly it carries the shaft 7 and print head 8 with it and brings the print elements 9 sharply into printing contact with the card C that is at that time interposed between the print head and a platen surface 154. If a foreign object should be inadvertently interposed between the print head and the card, the spring 60 yields and the stud 36 slides in the slot 35, thereby preventing damage to the printing unit and to the foreign object.

In the operation of the Gardinor machine, the contacts PR3 complete a circuit from the zero potential line therein designated 403, through the normally open side of the contacts PR3, through the manual "auto feed" switch therein designated 456 and through the card feed clutch magnet therein designated 28, to the positive potential line therein designated 402. The electromagnet 78 in the print unit 1 is connected in parallel with the card feed clutch magnet 28 through the load terminal of the switch 136, through the electromagnet 78, through the card lever contacts 120 and the On terminal of the switch 134 to the line 402. A parallel circuit is provided from a point 155 through a rectifier 156 and the Run terminal of the switch 136 to the electromagnet 78. When the switch 136 is set on its Load terminal, the electromagnet 78 is deenergized when the contacts PR3 transfer back to normal. When the switch 136 is set in its Run terminal, the electromagnet 78 is picked through PR3, the auto feed switch 456, the rectifier 156 and the Run terminal of the switch 136. When the contacts PR3 transfer back to normal, the electromagnet 78 is held through the contacts CF5, a rectifier 158 and the Run terminal of the switch 136. The rectifier 156 is inserted to prevent back circuits when the electromagnet 78 is held through CF5. The rectifier 158 is inserted to prevent back circuits when the electromagnet 78 is picked through the rectifier 156 and the Run terminal of the switch 136. A third rectifier 160 is inserted to prevent back circuits when a tube T–1 in the Gardinor machine keyboard restore circuit fires and the potential of the point 162 drops.

In normal operation where it is desired to energize the print magnet 78 during every card feed cycle, the switch 134 is in the On position and the switch 136 is in the Run position. When it is desired that the print magnet not be energized during card feed cycles, the switch 134 is in the Off position and the position of the switch 136 is immaterial. When it is desired to service the print unit 1, for example, to replace the ink pad 76, it is desired that the print head 8 be locked in its actuated (down) position in which position the ink pad 76 is pivoted away from the print elements 9. For such servicing, the switch 136 is set on its Load terminal and the switch 134 is On. When the contacts PR3 return to normal, the electromagnet 78 is deenergized since the hold circuit that is normally set up through the Run terminal of the switch 136 is now incomplete. When the electromagnet is thus deenergized, the armature lug 92 engages the notch 96 on the shaft 7 and latches the print head 8 in its actuated position. The service door 124 may be raised thereby mechanically locking the card lever 116 to prevent the closing of the contact 120 and the actuation of the electromagnet 78.

With the door 124 raised, it is impossible to actuate the card lever 116 but it is possible to feed cards so that they jam under the card lever 116. To prevent such card feeding and jamming, the switch 146 is positioned to be actuated by the door 124 when the latter is raised. The switch contacts 146 are in the line 403 and break all operating circuits of the machine except for the cathode heater circuits.

When the print head 8 is latched down for servicing and it is desired to resume operation, the switch 136 is switched from Load to Run and a card feed cycle is initiated. The card C actuates the card lever 116 closing the contacts 120 and energizing the electromagnet 78 thereby releasing the shaft 7 from the armature lug 92. In the latched down position there is clearance between the print head 8 and the card feed bed 3 for a card. From the latched position the downward stroke of the print unit is short but sufficient to effect printing on the interposed card C.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A printing device comprising, in combination, a cam element, means for cycling said cam element, a print member and a platen member, one of which is movable relative to the other for effecting printing, a record receiving opening between said members, means operable in timed relation with the cycling of said cam element for feeding records into said opening, means yieldingly urging said moveable member from said other member, means operable by said cam element for imparting said printing movement to said movable member, means normally latching said movable member to inhibit said printing movement thereof, means yieldingly connecting said operable means and said movable member to permit operation of said operable means when said latching means is normal and to effect printing movement of said movable member when said latching means is unlatched, means for unlatching said latching means, means aligned with said opening and operable by a said record inserted therein for operating said unlatching means.

2. The device of claim 1 including a protective cover therefor, access means in said cover movable to closed and open positions, means operable by the opening of said access means for inhibiting the operation of said unlatching means when a record is inserted in said opening.

3. A serial number device comprising, in combination, a cam element, means for cycling said cam element, a platen, a print head movable relative to said platen for effecting printing and having a plurality of rotatable print elements, a record receiving opening between said print head and said platen, means operable in timed relation with the cycling of said cam element for feeding records into said opening, means yieldingly urging said print head away from said platen, means operable by said cam element for imparting said printing movement to said print head, means normally latching said movable member to inhibit said printing movement, means yieldingly connecting said operable means and said movable print head to permit operation of said operable means when said latching is normal and to effect printing movement of said movable print head when said latching means is unlatched, means operable for unlatching said latching means, means aligned with said opening and operable by a said record inserted therein for operating said unlatching means.

4. A serial numbering machine comprising, in combination, a cam element, means for cycling said cam element, a platen, a print head movable relative to said platen for effecting printing and having a plurality of rotatable print elements, a record receiving opening between said platen and said print head, means operable in timed relation with the cycling of said cam element for feeding records into said opening, means yieldingly urging said print head away from said platen, means including a cam follower cooperable with said cam element for imparting said printing movement to said print head, a latch member normally latching said print head to inhibit said printing movement, means, including a spring, yieldingly connecting said movement inparting means and said movable print head to permit operation of said movement imparting means when said latching means is normal and to effect printing movement of said movable print head when said latching means is unlatched, an electromagnet actuatable for unlatching said latch member, a record operated lever aligned with said opening and operable when a said record is inserted therein and circuitry including contacts operated by said lever for actuating said electromagnet.

5. The numbering machine of claim 4 including a protective cover therefor, access means in said cover movable to closed and open positions and including interposer means operable when said access means is open for inhibiting the operation of said lever whereby said numbering machine is rendered inoperable.

6. In a machine adapted for moving records in a serial manner and in a predetermined path, the combination of a serial number printing unit positioned to apply a serial number to each said record at a predetermined point of its travel along said path, said unit comprising a movable print head and a platen positioned at said point adjacent to and on opposite sides of said path, means yieldingly urging said print head away from said platen, cam means operable in timed relation with the movement of records along said path, cam follower means operable by said cam means for inparting printing movement to said print head, means normally latching said print head against said movement, means yieldingly connecting said cam follower means and said movable print head to permit operation of said cam means and said cam follower means when said latching means is normal and to effect said printing movement of said print head when said latching means is unlatched, means operable for unlatching said latching means, and means positioned at said point in said path and operable by a said record for operating said unlatching means.

7. The machine of claim 6 including a protective cover for said unit, access means in said cover movable to closed and open positions and including interposer means operable when said access means are open for inhibiting the operation of said unlatching means.

References Cited in the file of this patent

UNITED STATES PATENTS

| | | |
|---|---|---|
| 1,091,279 | Boss | Mar. 24, 1914 |
| 1,144,340 | Campbell | June 22, 1915 |
| 1,800,704 | Stahl | Apr. 14, 1931 |
| 1,906,019 | Svensson | Apr. 25, 1933 |
| 1,949,283 | Murtagh | Feb. 27, 1934 |
| 1,986,352 | Moulton | Jan. 1, 1935 |
| 2,003,787 | Lake | June 4, 1935 |
| 2,070,310 | Ostler | Feb. 9, 1937 |
| 2,084,098 | Long | June 15, 1937 |
| 2,087,315 | Bugg | July 20, 1937 |
| 2,276,111 | Spears | Mar. 10, 1942 |